US010519289B2

(12) United States Patent
Huang et al.

(10) Patent No.: US 10,519,289 B2
(45) Date of Patent: Dec. 31, 2019

(54) EXPANDED THERMOPLASTIC POLYURETHANE BEADS AND PREPARATION METHOD AND APPLICATION THEREOF

(71) Applicant: Miracll Chemicals Co., Ltd., Yantai, Shandong (CN)

(72) Inventors: Bo Huang, Shandong (CN); Renhong Wang, Shandong (CN); Guangfu Wang, Shandong (CN); Sheng Zhang, Shandong (CN); Qijun Sun, Shandong (CN)

(73) Assignee: Miracll Chemicals Co., Ltd., Yantai, Shandong (CN)

( * ) Notice: Subject to any disclaimer, the term of this patent is extended or adjusted under 35 U.S.C. 154(b) by 0 days.

(21) Appl. No.: 15/120,083

(22) PCT Filed: Jul. 21, 2014

(86) PCT No.: PCT/CN2014/082594
§ 371 (c)(1),
(2) Date: Aug. 18, 2016

(87) PCT Pub. No.: WO2015/123960
PCT Pub. Date: Aug. 27, 2015

(65) Prior Publication Data
US 2017/0218154 A1    Aug. 3, 2017

(30) Foreign Application Priority Data

Feb. 18, 2014   (CN) .......................... 2014 1 0054599

(51) Int. Cl.
| | |
|---|---|
| *B29B 13/02* | (2006.01) |
| *B29B 9/06* | (2006.01) |
| *C08J 9/00* | (2006.01) |
| *C08J 9/14* | (2006.01) |
| *C08J 9/18* | (2006.01) |
| *C08J 9/232* | (2006.01) |
| *C08L 75/04* | (2006.01) |
| *B29K 75/00* | (2006.01) |
| *B29K 105/04* | (2006.01) |

(52) U.S. Cl.
CPC ............ *C08J 9/0023* (2013.01); *B29B 9/065* (2013.01); *B29B 13/02* (2013.01); *C08J 9/0061* (2013.01); *C08J 9/141* (2013.01); *C08J 9/18* (2013.01); *C08J 9/232* (2013.01); *B29K 2075/00* (2013.01); *B29K 2105/048* (2013.01); *C08J 2203/14* (2013.01); *C08J 2205/046* (2013.01); *C08J 2205/052* (2013.01); *C08J 2375/04* (2013.01); *C08J 2427/06* (2013.01); *C08J 2431/04* (2013.01); *C08J 2455/02* (2013.01)

(58) Field of Classification Search
CPC . C08J 9/16; C08J 9/0023; C08J 9/0061; C08J 9/0095; C08J 9/141; C08J 9/18; C08J 9/232; C08J 2203/14; C08J 2205/046; C08J 2205/052; C08J 2375/04; C08J 2427/06; C08J 2453/02; B29B 9/065; B29B 13/02; B29K 2075/00; B29K 2105/048; C08G 201/0066; C08L 75/04
See application file for complete search history.

(56) References Cited

U.S. PATENT DOCUMENTS

| | | | |
|---|---|---|---|
| 3,882,191 A | 5/1975 | Balatoni et al. | |
| 8,063,177 B2 | 11/2011 | Minami et al. | |
| 2002/0193459 A1* | 12/2002 | Haseyama | ............ B29C 44/348 521/155 |
| 2007/0227814 A1* | 10/2007 | Schabel, Jr. | ............ B60R 13/08 181/288 |
| 2010/0222442 A1 | 9/2010 | Prissok et al. | |
| 2010/0240854 A1 | 9/2010 | Minami et al. | |
| 2012/0329892 A1 | 12/2012 | Prissok et al. | |

FOREIGN PATENT DOCUMENTS

| | | |
|---|---|---|
| CN | 101821326 A | 9/2010 |
| CN | 102070841 A | 5/2011 |
| CN | 103642200 A | 3/2014 |
| CN | 103804889 A | 5/2014 |
| EP | 3109280 A1 | 12/2016 |
| JP | 2007091840 A | 4/2007 |
| WO | 2007082838 A1 | 7/2007 |
| WO | WO-2010010010 A1 * | 1/2010 |

OTHER PUBLICATIONS

Machine translation of WO 2010/010010 A1 obtained from the European Patent Office (Oct. 2017).*

(Continued)

*Primary Examiner* — Melissa A Rioja
(74) *Attorney, Agent, or Firm* — Greenberg Traurig, LLP

(57) ABSTRACT

The present invention relates to expanded thermoplastic polyurethane beads, a preparation method for same, and an application thereof. The expanded thermoplastic polyurethane beads consists of components of the following parts by weight: 100 parts of a thermoplastic polyurethane, 1-10 parts of a cell size stabilizer, and 1-35 parts of a melt viscosity modifier. The preparation method for the expanded thermoplastic polyurethane beads is also disclosed. The bead is produced by employing a volatile blowing agent to immerse the thermoplastic polyurethane, comprising the pore size stabilizer and the melt viscosity modifier, in an aqueous suspension, and is then followed by the foaming process. Utilization of the expanded thermoplastic polyurethane beads of the present invention allows for preparation of a foam product. The expanded thermoplastic polyurethane beads prepared per the present invention has uniform cell sizes and a high product yield. At the same time, the expanded thermoplastic polyurethane bead provides a great sintering performance even at a relatively low vapor pressure, a molded foam product has a small deformation, a low dimensional shrinkage ratio relative to a mold, great dimensional stability, and an aesthetically appealing appearance.

6 Claims, No Drawings

(56) References Cited

OTHER PUBLICATIONS

Machine translation of CN103642200 to Wang et al. obtained from the European Patent Office on Jun. 28, 2019.*
European Search Report dated Jun. 16, 2017, issued by the European Patent Office in European Application No. 14883292.6 (7 pages).

* cited by examiner

EXPANDED THERMOPLASTIC POLYURETHANE BEADS AND PREPARATION METHOD AND APPLICATION THEREOF

CROSS-REFERENCE TO RELATED APPLICATIONS

The present application is the national stage of, and claims priority from, International Patent Application No. PCT/CN2014/082594, filed Jul. 21, 2014, which claims priority from Chinese Patent Application No. CN201410054599.7, filed Feb. 18, 2014, the entire disclosures of both of which are hereby incorporated by reference herein.

FIELD OF THE INVENTION

The present invention relates to expanded thermoplastic polyurethane beads and a preparation method and the application thereof, belonging to the field of expanded plastic materials.

DESCRIPTION OF RELATED ART

The expanded polymer material is prepared by filling plenty of bubbles into the matrix of plastics using physical or chemical methods. The expanded material has the advantages of low density, good thermal and acoustic insulation, high intensity, and energy absorption thereby being widely used in packaging industry, manufacturing industry, agriculture, transportation, military industry, aerospace industry, daily necessities, and the like. Common types of expanded plastics include soft and hard foamed polyurethane (PU) plastics, expanded polystyrene (PS) plastics, expanded polyethylene (PE) plastics, expanded polypropylene (PP) plastics, and so on. However, in the foaming process of the expanded polyurethane plastics, harmful residues of isocyanate are usually found. Another disadvantage of expanded material is the lack of recyclability. Expanded polystyrene plastic products are difficult to degrade, resulting in the 'white pollution' problems more likely. The United Nations Environment Organization has decided to suspend using the expanded PS plastic products. The expanded polyethylene plastics have a poor heat-resistant performance, thus not being suitable for applications in high-temperature environments.

The thermoplastic polyurethane elastomer (TPU) has the advantages of wide hardness range, excellent abrasion resistance and mechanical strength, water, oil, chemical corrosion, and mold resistance, being environmentally friendly, and recyclability, etc. After filled into a mold, the expanded thermoplastic polyurethane beads are hot molded with steam to obtain a molded foamed product. Other than preserving the excellent performance of the original matrix, the product also has the advantages of excellent resilience, shape diversity, and low density, thereby being applicable in a wider range of temperature. Based on the above advantages, the expanded TPU material is expected to have a very wide range of applications in many industrial fields (automotive industry and packaging materials) and daily life fields (shoe materials, pillows, and mattresses).

A moldable foam bead based on thermoplastic polyurethane has been disclosed in WO 2007082838. However, the reported expanded thermoplastic polyurethane beads have the disadvantages of coarse cell structure, occurrence of 'wrinkles' on the surface of the beads, and a low production yield.

Additionally, for the expanded thermoplastic polyurethane beads and the molded products thereof, the thermoplastic polyurethane resin used has a narrow range of melting temperature and a high melt viscosity, Soft and hard segments are mixed in polymer chains, and the hard segments may crystallize due to the hydrogen bonds among molecular chains, so that the material belongs to semi-crystalline material. For the subsequent molding processes, it is required to soften the material to an appropriate half-molten state. Therefore, the dimensional shrinkage and deformation of the molded foam product may be affected by factors like resin melt viscosity, crystallinity, and the mobility of the polymer chains in the half-molten state. Particularly, products with a high expansion ratio are more vulnerable to these factors. Inventors of the present invention have attempted to control the shrinkage and deformation of the expanded particles and products thereof by adjusting the resin crystallinity, molecular weight of the soft segment, molecular weight distribution. However, various problems occurred in the beads production and product molding processes.

In addition, for the application in the fields of daily life (shoe, pillows, and mattresses), leisure venues (floor coatings), cushioning packaging materials, and the like, most customers focus on the appearance of the molded foam products. Because the foam product is prepared by steam heating to achieve mutual sintering among the expanded beads, cracks, pores, wrinkles, or tortoiseshell marks may be generated on the sintering surface between the expanded beads. In order to solve this problem, the pressure of the molding steam is usually increased to promote the sintering among the expanded beads. However, the increase of the molding steam pressure consumes more energy, thus leading to an increased cost in the molding process. In addition, a mold with a higher pressure endurance is needed consequently, resulting in an increased cost on equipment.

SUMMARY OF THE INVENTION

To solve the technical problem, the present invention provides an expanded thermoplastic polyurethane bead with uniform cell size and a high production yield, and a preparation method thereof. The foam product is obtained by molding with low-pressure steam. Thus, even under the condition where a short post-curing time was given for restoring the shrunk and deformed product, a foam product with a small deformation, a low dimensional shrinkage ratio relative to the mold, an excellent dimensional stability, and a good surface appearance can still be obtained.

The technical solution of the present invention for solving the above technical problem is as follows: an expanded thermoplastic polyurethane bead, consisting essentially of components of the following parts by weight: 100 parts of a thermoplastic polyurethane, 1-10 parts of a cell size stabilizer, and 1-35 parts of a melt viscosity modifier.

On the basis of the above-mentioned technical solution, the following improvements can also be brought upon by the present invention.

The melt viscosity of the expanded thermoplastic polyurethane beads at 180° C. is 8000-15000 poises.

Melt viscosity refers to the viscosity of a resin when heated to melt state under given conditions, and it can be measured by a viscometer. Melt viscosity directly reflects the fluidity of the resin. For example, when the viscosity is low, injection molding is easier to perform for thin products. The units of the viscosity include centistoke, and centipoise. Centistoke (cst) is the smallest unit of kinematic viscosity, whereas centipoise (cP) is the smallest unit of dynamic viscosity, One centipoise is equal to 0.01 poise, that is, 1 cP=0.01 P.

The melt viscosity of the thermoplastic polyurethane resin does not change much in the foaming process, and thus the melt viscosity of the expanded thermoplastic polyurethane beads at 180° C. in the present invention can be obtained through the adjustment of the thermoplastic polyurethane resin. The melt viscosity of the expanded thermoplastic polyurethane at 180° C. is 8000-15000 poises, preferably between 10000 and 13000 poises.

Further, the Shore hardness of the thermoplastic polyurethane is 55-95 A, preferably 60-90 A.

Hardness is a physical measurement of compressive deformation degree or puncture resistant ability of a material. There are two types of hardness, relative hardness and absolute hardness. The absolute hardness is usually used in scientific research, but rarely used in the practice of industrial production. The hardness system normally adopted in the field of expanded materials is the relative hardness, usually identified by the following: Shore, Rockwell, and Brinell. The Shore hardness is generally used for rubber materials to measure the resistance ability of the surface of plastics or rubbers against the puncture of hard objects. The conversion relationship between the Shore hardness (HS) and the Brinell hardness (BHN) is HS=BHN/10+12. The test method of the Shore hardness is as follows: a Shore hardness meter is inserted into a tested material, with a pointer on a meter dial connected to a puncture needle through a spring. The needle punctures into the surface of the measured object, and the displayed value on the meter dial is the hardness value.

Further, the melt flow rate (MI) of the thermoplastic polyurethane is 5-50 g/10 min. preferably 10-45 g/10 min.

The above value is measured by applying a weight of 5 kg at 180° C. according to ASTM-1238 standard. ASTM stands for the American Society for Testing and Materials, formerly known as the International Association for Testing Materials (IATM). In the 1880s, in order to solve the disputes and various opinions of purchasers and suppliers in the transaction of industrial materials, it was proposed to establish a technical committee, responsible for organizing technical symposiums for representatives of all involved parties to participate and discuss the contentious issues in material specifications and test procedures. The missions of the ASTM are to promote public health and safety, improve quality of life, provide reliable raw materials, products, systems, and services, and to promote the national, regional, and further the international economy. The ASTM-1238 is a standard of the ASTM for testing a melt flow rate of plastics.

Further, the cell size stabilizer is selected from the group consisting of dihydroxypropyl stearate (GMS), sorbitan monolaurate, sorbitan monopalmitate, sorbitan monostearate, and sucrose fatty acid ester, or a mixture thereof.

The phase separation of hard and soft segments present within the used thermoplastic polyurethane resin molecules may result in non-uniform distribution of the foaming agent in the resin during the foaming process, and finally, the expanded beads has a coarse cell size distribution and irregular cell size. The cell diameter of the expanded thermoplastic polyurethane beads of the present invention is 500 μm-800 μm. The cell size stabilizer facilitates entry and uniform distribution of the volatile foaming agent in the thermoplastic polyurethane particle. The amount of the cell size stabilizer is 1-10 parts by weight, preferably 2-8 parts by weight.

Further, the melt viscosity modifier is selected from the group consisting of ethylene-vinyl acetate copolymer (EVA), poly (vinyl chloride) (PVC), polypropylene-butadiene-styrene resin (ABS), and polystyrene-polyethylene-polybutylene-polystyrene (SBS), or a mixture thereof.

The preparation of the expanded thermoplastic polyurethane beads and the steam-chest molding foam product requires heating the material to a softened state. Because crystallization occurs among the hard segments in the thermoplastic polyurethane resin, the walls of cells may be deformed during the expansion, which leads to the occurrence of wrinkles on the surface of the expanded beads or to an insufficient strength of the foam product, as well as a serious dimensional shrinkage. In order to avoid the shrinkage of the foam product and the wrinkles on the surface of the expanded beads, the thermoplastic polyurethane resin should have a sufficient strength during processing and the strain leading to the shrinkage should not be allowed, that is, the polymer chains should be able to extend themselves freely during the expansion of the walls of cells. After the melt viscosity modifier is added into the thermoplastic polyurethane resin, the range of the melt processing temperature is broaden, thereby improving the mobility of the polymer chain in the melting state. The amount of the melt viscosity modifier added is 1-35 parts by weight, preferably 5-30 parts by weight. When the amount added is lower than 5 parts by weight, the effect of improvement on the melt viscosity of the thermoplastic polyurethane is not evident, while when the amount added is higher than 30 parts by weight, there is a great decrease in the melt viscosity of TPU, and rupture of the cells may happen more likely during the preparation of the expanded beads, making it hard to obtain closed cells.

Another technical solution of the present invention for solving the above technical problem is as follows: a preparation method of a expanded thermoplastic polyurethane bead, comprising the following steps:

(1) In order to facilitate the subsequent operations in the thermoplastic polyurethane foaming process, the thermoplastic polyurethane may be previously processed in the melt state by an extruder to obtain thermoplastic polyurethane particles with a desired shape. The method normally used is described as follows: uniformly mixing 100 parts by weight of a thermoplastic polyurethane, 1-10 parts by weight of a cell-size stabilizer, and 1-35 parts by weight of a melt viscosity modifier (other additives like antioxidant, anti-yellowing agent, antistatic agent may also be added) using a high speed mixing machine or a masterbatch mixing machine; introducing the mixture into an extruder for melting; after cooling down in a water tank for shaping, cutting the extruded strips or pelletizing the melt extruded from the die, so as to obtain thermoplastic polyurethane particles.

(2) Placing the thermoplastic polyurethane particles obtained in the step (1), a volatile foaming agent, and water into a pressure vessel; raising the temperature to 115-118° C. (near the softening point of the thermoplastic polyurethane); keeping the pressure in the pressure vessel at 18 bar-26 bar; after keeping the constant temperature and pressure in the pressure vessel for 20 minutes, discharging the suspension from the pressure vessel into the atmospheric environment, so as to obtain expanded thermoplastic polyurethane beads. The expanded thermoplastic polyurethane beads obtained in the present invention have a density of 0.08-g/cm$^3$.

Further, the volatile foaming agent is a mixture of one or more of propane, n-butane, isobutane, n-pentane, and isopentane, and the amount added is 1-40 parts by weight.

The present invention further includes an application of the expanded thermoplastic polyurethane beads in fabricating an expanded thermoplastic polyurethane foam product. The expanded thermoplastic polyurethane foam product is a molded product obtained after expanding and sintering the expanded thermoplastic polyurethane beads with steam at 1-3 bar.

The expanded thermoplastic polyurethane molded product is obtained after expanding and sintering the expanded particles by heating in steam at 1-3 bar. The expanded thermoplastic polyurethane particles of the present invention can still be used to obtain a foam product with excellent performance with the molding pressure even as low as 1 bar-1.5 bar.

The technical advantages of the present invention are as follows: the expanded thermoplastic polyurethane beads prepared in the present invention have a uniform cell size and a high production rate. The expanded thermoplastic polyurethane beads still have a good sintering performance even at a low steam pressure, and the obtained molded foam product has an advantage of a limited deformation, a low dimensional shrinkage ratio relative to the mold, excellent dimensional stability, and a good surface appearance.

DETAILED DESCRIPTION OF THE INVENTION

Description of the principles and features of the present invention are given in what follows. The listed examples are only used for the explanation of the present invention, and are not intended to limit the scope of the present invention.

The raw material thermoplastic polyurethane elastomer particle is usually prepared by mixing isocyanate, an active hydrogen-containing compound with a molar mass of 500-10000 g/mol, and a chain extender with a molar mass of 50-500 g/mol, wherein a catalyst is added during the production.

Preferred starting raw materials for producing the thermoplastic polyurethane particles in the present invention are described by way of examples as follows:

The isocyanate includes aliphatic, alicyclic, aromatic, and araliphatic series diisocyanate is preferred, such as toluene diisocyanate (TDI), diphenyl methane-2,2'-diisocyanate (MDI) (where 2,2'- can be replaced with 2,4'- or 4,4'-), 3-isocyanatomethylene-3,5,5-trimethylcyclohexyl isocyanate (IPDI), hexamethylene diisocyanate (HDI), dicyclohexyl methane diisocyanate (HMDI), 1,5-naphthalene diisocyanate (NDI), p-phenylene diisocyanate (PPDI), 1,4-cyclohexane diisocyanate (CHDI), or cyclohexane dimethylene diisocyanate HXDI), and especially preferably diphenyl methane-4,4'-diisocyanate (MDI).

The active hydrogen-containing compound includes polyester polyol, polyether polyol, and polycarbonate polyol. Polyester polyol having a molar mass of 800-1200 g/mol and polyether polyol having a molar mass of 500-2000; g/mol are preferred. Polyether polyol is especially preferred, wherein the average number of functionality is 1.8-2.5, preferably 1.9-2.0, and 2 is especially preferred. Examples include polyethylene glycol adipate (PEA), polydiethylene glycol adipate (PDA), polybutylene glycol adipate (PBA), polypropylene glycol adipate (PPA), polyoxypropylene glycol, polytetramethylene ether glycol (PTMEG), and especially preferred are polybutylene glycol adipate (PBA) and polytetramethylene ether glycol (PTMEG).

The chain extender includes an aliphatic, aromatic, or alicyclic diol compound having a molar mass of 50-500 g/mol. Examples include ethylene glycol (EG), 1,4-butanediol (BDO), 1,2-propylene glycol (PG), 1,6-hexanediol (HD), hydroquinone bis(2 hydroxyethyl) ether (HQEE), resorcinol bis (hydroxyethyl) ether (HER), dipropylene glycol (DPG), 1,4-cyclohexanedimethanol (CHDM), and especially preferred is ably 1,4-butanediol (BDO).

The catalyst raises the reaction rate between isocyanate group and hydroxyl group. The commonly used catalyst includes triethylene diamine, dimethyl cyclohexyl amine, triethylamine (N,N,N', N'-tetraethylmethylenediamine), 1,4-dimethyl piperazine, dibutyltin dilaurate, potassium isooctanoate, tetrabutyl titanate, and tetraisopropyl titanate.

The thermoplastic polyurethane elastomer particle is continuously produced using a conventional method, such as extrusion reaction type of extruder, or through the one-pot or a prepolymer method.

Types of the thermoplastic polyurethane beads used in examples and control examples, and the proportions added of each component are shown in Table 1.

TABLE 1

| Bead type | MI (g/10 min) | Amount added | Cell size stabilizer Type | Amount added | Melt viscosity modifier Type | Amount added |
|---|---|---|---|---|---|---|
| T1 | 20 | 100 | Dihydroxypropyl stearate | 5 | EVA | 10 |
| T2 | 25 | 100 | Sorbitan monolaurate | 3 | PVC | 15 |
| T3 | 30 | 100 | Sucrose fatty acid ester | 2 | ABS | 10 |
| T4 | 20 | 100 | Dihydroxypropyl stearate | 5 | — | — |
| T5 | 25 | 100 | — | — | PVC | 15 |
| T6 | 20 | 100 | — | — | — | — |

Example 1

100 parts of TPU particle having an MI of 20 g/10 min, 5 parts by weight of dihydroxypropyl stearate, 10 parts by weight of EVA were uniformly mixed via a high speed mixer; and then the mixture was put into a twin-screw extruder for melt mixing. The melted mixture was extruded into strips using an extruder with a die having a diameter of 2 mm; the strips were cooled for shaping in a water tank, and pelletized by a granulation and pelletizing machine to obtain thermoplastic polyurethane particles.

100 parts by weight of the above obtained thermoplastic polyurethane particles and 400 parts by weight of water were added into a 10 L autoclave; and 30 parts by weight of a foaming agent n-butane was added while stirring. The autoclave was heated to 118° C. and maintained at this temperature for 20 minutes; a discharge valve at the bottom of the autoclave was opened to discharge the mixture from the autoclave into the atmospheric environment to obtain expanded thermoplastic polyurethane particles. The obtained expanded thermoplastic polyurethane beads have a foam density of 0.16 g/cm$^3$, and a cell diameter of 550 μm.

The obtained expanded thermoplastic polyurethane beads were filled into a mold with the length of 300 mm, the width of 250 mm, and the thickness of 50 mm. The particles are sintered and compressed 10 percent into the mold by the steam with the pressure of 1.4 bar. An expanded thermoplastic polyurethane molded foam product was then obtained. After standing for 2 hours at 50° C.×50% RH, the foam product is dried for 2 hours in a thermostatic chamber at 80° C. After being maintained for 2 hours at 25° C.×50% RH, its performance was evaluated, as shown in Table 2.

Example 2

Sorbitan monolaurate, used as a cell size stabilizer, was added into 100 parts of TPU having an MI of 25 g/10 min. PVC was used as a melt viscosity modifier. The foaming temperature was set to 116° C., and n-pentane was used as a foaming agent. Other than those described above, expanded thermoplastic polyurethane beads and an expanded thermoplastic polyurethane molded foam product were obtained using the same method described in Example 1. The evaluation of the performance is shown in Table 2.

Comparative Example 3

Expanded thermoplastic polyurethane beads and an expanded thermoplastic polyurethane molded foam product were obtained using the same method described in Example 2, except that no cell size stabilizers or melt viscosity modifiers were added into 100 parts of a TPU particle having an MI of 20 g/10 min. The evaluation of the performance is shown in Table 2.

Production process conditions and physical properties of the expanded thermoplastic polyurethane particles and the performance evaluation of the molded foam products are shown in Table 2.

TABLE 2

| | | Foaming agent | | | | | | | |
|---|---|---|---|---|---|---|---|---|---|
| | Bead | Type | Amount added | Foaming temperature | Particle density | Cell diameter | Molding pressure | Deformation of foam product | Surface properties of foam product |
| Example 1 | T1 | n-butane | 30 | 118 | 0.16 | 550 | 1.4 | ○ | ○ |
| Example 2 | T2 | n-pentane | 35 | 116 | 0.12 | 600 | 1.3 | ○ | ○ |
| Example 3 | T3 | n-butane | 28 | 115 | 0.18 | 620 | 1.2 | ○ | ○ |
| Comparative Example 1 | T4 | n-pentane | 30 | 118 | 0.16 | 570 | 1.4 | ○ | x |
| Comparative Example 2 | T5 | n-pentane | 35 | 116 | 0.13 | 625 | 1.3 | Δ | x |
| Comparative Example 3 | T6 | n-butane | 30 | 118 | 0.15 | 680 | 1.4 | x | ○ |

Example 3

Sucrose fatty acid ester, used as a cell size stabilizer, was added into 100 parts of TPU having an MI of 30 g/10 min. ABS was used as a melt viscosity modifier. The foaming temperature was set to 115° C., and n-butane was used as a foaming agent. The steam molding pressure was 1.2 bar. Other than those described above, expanded thermoplastic polyurethane beads and an expanded thermoplastic polyurethane molded foam product were obtained using the same method described in Example 1. The evaluation of the performance is shown in Table 2.

Comparative Example 1

Expanded thermoplastic polyurethane beads and an expanded thermoplastic polyurethane molded foam product were obtained using the same method described in Example 1, except that dihydroxypropyl stearate was added alone into 100 parts of a TPU particle having an MI of 20 g/10 min as a cell size stabilizer. The evaluation of the performance is shown in Table 2.

Comparative Example 2

Expanded thermoplastic polyurethane beads and an expanded thermoplastic polyurethane molded foam product were obtained using the same method described in Example 2, except that PVC was added along into 100 parts of a TPU having an MI of 25 g/10 min as a melt viscosity modifier. The evaluation of the performance is shown in Table 2.

Various evaluations were implemented according to the following methods.

1. Deformation of Foam Product

The appearance of the foam molded product was observed by macroscopic method. The foam product in which no shrinkage and wrinkles (stripes above 1 cm) are observed is evaluated as ○, whereas the foam product in which only wrinkles exist but no shrinkage is observed is evaluated as Δ; and the foam molded product having many wrinkles and an irregular overall shape is evaluated as x.

2. Surface Properties of Foam Product

The surface of the molded foam product is observed. An average number of gaps between expanded beads of above 1 cm² per 10 cm² area is calculated. The following observation is determined as follows:

○ indicates the number being less than 100; and

Δ indicates the number being more than 100.

As can be seen from the above examples and Comparative examples, the expanded thermoplastic polyurethane beads prepared in Examples 1 to 3 have a uniform cell size and a high production yield rate. Compared with the Comparative Examples 1 to 3, the molded foam products obtained in Examples 1 to 3 have a limited deformation, and no observable shrinkages or wrinkles (strips above 1 cm); the gaps between the expanded beads are small; the shrinkage ratio is low, and the dimensional stability and surface appearance are excellent.

The examples above were merely preferred embodiments of the present invention, and they are not intended to limit the present invention. Any modification, equivalent substitution, and improvement made within the spirit and principle of the present invention shall fall into the protection scope of the claims of the present invention.

What is claimed is:

1. A process comprising:
   (1) mixing 100 parts by weight of a thermoplastic polyurethane, 1-10 parts by weight of a cell size stabilizer, and 1-35 parts by weight of a melt viscosity modifier to form a mixture; introducing the mixture into an extruder to obtain a melt which is then extruded to provide extruded strips; obtaining thermoplastic polyurethane particles by cooling and then cutting the extruded strips, or by performing underwater pelletizing after the melt is extruded via a die to provide extruded strips; and
   (2) adding the thermoplastic polyurethane particles obtained in step (1), a volatile foaming agent, and water into a pressure vessel; raising the temperature to 115-118° C.; maintaining the pressure in the pressure vessel at 18-26 bar; maintaining constant temperature and pressure in the pressure vessel for 20 minutes to obtain a suspension, discharging the suspension from the pressure vessel, and obtaining expanded thermoplastic polyurethane beads
   wherein the expanded thermoplastic polyurethane beads comprise: 100 parts by weight of the thermoplastic polyurethane, 1-10 parts by weight of the cell size stabilizer, and 1-35 parts by weight of the melt viscosity modifier,
   wherein the cell size stabilizer is selected from the group consisting of: sorbitan monolaurate, sorbitan monopalmitate, sorbitan monostearate, and a sucrose fatty acid ester, and mixtures thereof, and
   wherein the melt viscosity modifier is chosen from: an ethylenevinyl acetate copolymer, a polypropylene-butadiene-styrene resin, a polystyrene-polyethylene-polybutylene-polystyrene resin, or mixtures thereof.

2. The process of claim 1, wherein the melt viscosity of the expanded thermoplastic polyurethane beads at 180° C. is 8000-15000 poise.

3. The process of claim 1, wherein the expanded thermoplastic polyurethane beads possess a Shore hardness of 55-95 A.

4. The process of claim 1, wherein the melt flow rate of the thermoplastic polyurethane is 5-50 g/10 minutes.

5. The process of claim 1, wherein the volatile foaming agent is one or more of propane, n-butane, isobutane, n-pentane, and isopentane; and the amount added of the volatile foaming agent is 1-40 parts by weight.

6. The process of claim 1 further comprising expanding and sintering the expanded thermoplastic polyurethane beads with steam at a pressure of 1-3 bar.

* * * * *